United States Patent
Dupertuis

(10) Patent No.: US 9,977,404 B2
(45) Date of Patent: May 22, 2018

(54) METHOD FOR TESTING THE WATER RESISTANCE OF A TIMEPIECE

(71) Applicant: ROLEX SA, Geneva (CH)

(72) Inventor: Jean-Samuel Dupertuis, Geneva (CH)

(73) Assignee: ROLEX SA, Geneva (CH)

( * ) Notice: Subject to any disclaimer, the term of this patent is extended or adjusted under 35 U.S.C. 154(b) by 137 days.

(21) Appl. No.: 15/210,003

(22) Filed: Jul. 14, 2016

(65) Prior Publication Data
US 2017/0023916 A1   Jan. 26, 2017

(30) Foreign Application Priority Data
Jul. 22, 2015   (EP) .................................... 15177825

(51) Int. Cl.
*G01M 3/00* (2006.01)
*G01M 3/02* (2006.01)
*G04D 7/00* (2006.01)

(52) U.S. Cl.
CPC .............. *G04D 7/007* (2013.01); *G01M 3/02* (2013.01)

(58) Field of Classification Search
CPC . G01M 3/00; G01M 3/02; G04D 7/00; G04D 7/007
See application file for complete search history.

(56) References Cited

U.S. PATENT DOCUMENTS

| | | | | |
|---|---|---|---|---|
| 3,306,098 A | * | 2/1967 | Thassaus | G01M 3/20 73/49.3 |
| 3,517,547 A | * | 6/1970 | Morf | G04D 7/007 73/45.5 |
| 3,802,251 A | | 4/1974 | Durr | |
| 3,991,622 A | | 11/1976 | Oowada | |
| 9,310,272 B2 | * | 4/2016 | Willemin | G04D 7/007 |

FOREIGN PATENT DOCUMENTS

FR    2158061 A1    6/1973

OTHER PUBLICATIONS

European Search Report and Written Opinion dated Dec. 15, 2015 issued in counterpart application No. EP15177825; w/ English partial translation and partial machine translation (11 pages).

* cited by examiner

*Primary Examiner* — Nguyen Ha
(74) *Attorney, Agent, or Firm* — Westerman, Hattori, Daniels & Adrian, LLP

(57) ABSTRACT

Method for testing the water resistance of at least one timepiece, wherein it comprises the following stages:
E1—Measuring the rate of the timepiece when subjected to a first external pressure, in particular atmospheric pressure, in order to obtain a first reference rate value;
E2—Measuring the rate of a timepiece when subjected to a second external pressure inside a pressurization chamber, in order to obtain a second rate value under pressure;
E3—Comparing the rate value under pressure and the reference rate value in order to deduce therefrom the presence or otherwise of a deficiency in the water resistance in the event of a variation in excess of a predefined threshold.

20 Claims, 2 Drawing Sheets

METHOD FOR TESTING THE WATER RESISTANCE OF A TIMEPIECE

BACKGROUND

The invention relates to a method for testing the water resistance of a timepiece, such as a watch and more specifically a wristwatch. It also relates to a method for manufacturing a timepiece which implements said method for testing its water resistance, and to the timepiece such as that obtained by said manufacturing method. Finally, the invention also relates to a system for testing the water resistance of a timepiece which implements said method for testing its water resistance.

The water resistance of a timepiece is an important characterizing feature, and international standards ISO 22810 and ISO 6425 exist for this reason, which standards stipulate various requirements in respect of water resistance, for watches that are simply water resistant and for diver's watches respectively.

The prior art describes various solutions for measuring the water tightness of a timepiece, involving disposing the timepiece inside a closed chamber, inside which it is placed under pressure, and inside which mechanical characteristics are measured, as described in document U.S. Pat. No. 3,991,622, for example.

Document FR2158061 describes a solution for testing the water resistance of a watch, which is supported on a device having a microphone for the purpose of transforming the oscillations of the balance of a watch into an electrical signal and analysing it, in order to measure its rate. This measurement is complicated and not sufficiently reliable.

However, the existing solutions for measuring the water resistance are unsatisfactory. In fact, they include all or some of the following disadvantages:

They require complicated, dedicated equipment based on sensitive components disposed inside pressurization vessels;
They only process the items individually, according to a one-by-one approach;
They are only adapted for a type of item having a given geometry, and they require complex adjustments in order to process another item having another geometry;
They are not adapted for the production on an industrial scale of a large number of items and/or of items having different geometries;
They are only reliable for a part of the water resistance measurements to be carried out, for example being specialized either for the detection of minor leaks or for the detection of major leaks.

SUMMARY OF THE INVENTION

The aim of the invention is to provide another solution for testing the water resistance of a timepiece, which does not include the disadvantages associated with the prior art.

More particularly, a first object of the invention is to provide a simple and reliable solution for testing the water resistance of a time piece.

For this purpose, testing of the water tightness of at least one timepiece comprises the following stages:

Measuring the rate of the timepiece when subjected to a first external pressure, in particular atmospheric pressure, in order to obtain a first reference rate value;
Measuring the rate of the timepiece when subjected to a second external pressure, advantageously greater than the first external pressure, inside a pressurization chamber, in order to obtain a second rate value referred to below as the "rate value under pressure";
Comparing the rate value under pressure and the reference rate value in order to deduce therefrom the presence or otherwise of a deficiency in the water resistance in the event of a variation in excess of a predefined threshold.

Advantageously, at least one of the two stages involving measuring the rate of the timepiece includes the use of status reports for the timepiece and a comparison with a time between said two status reports measured by a reference clock.

The invention is defined more precisely by the claims.

These objects, characterizing features and advantages of the present invention are disclosed in detail in the following description of a particular embodiment given by way of non-exhaustive example in relation to the accompanying figures, of which:

DESCRIPTION OF PREFERRED EMBODIMENTS

The method for testing the water resistance of a timepiece according to the invention exploits the relationship existing between the pressure of the air surrounding a watch movement and the rate of said watch movement, the phenomenon being illustrated in FIGS. 3 and 4, for example, which are described below. The rate is defined here as the difference, per unit of time, between two states of a time-measuring instrument, separated by a given time interval (period). This is currently expressed as seconds per day [s/d]; if it is positive, the instrument is running fast, and conversely, if it is negative, the instrument is running slow.

Figure 1:
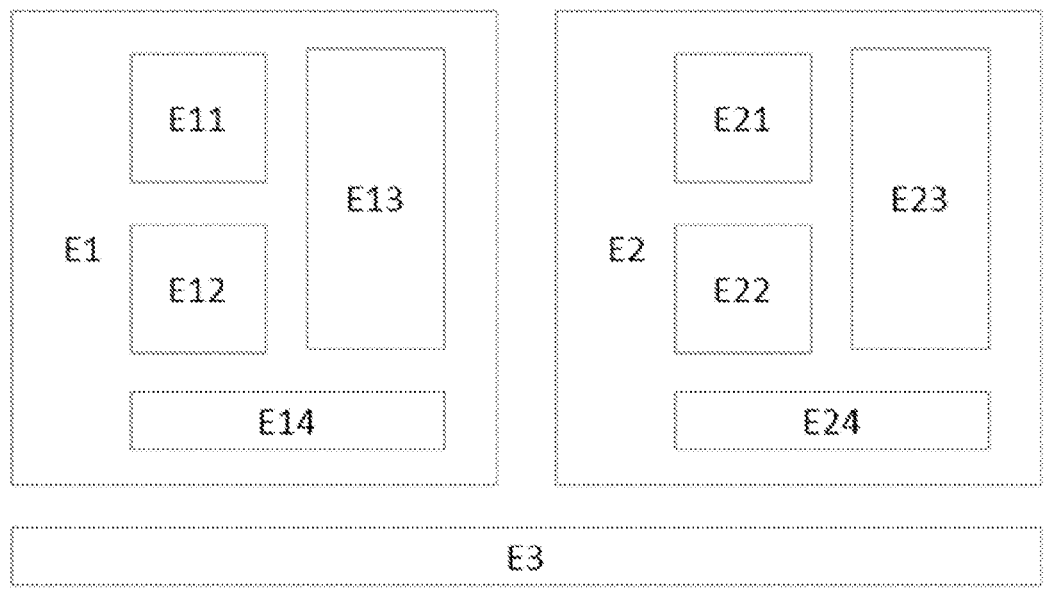
FIG. 1 depicts schematically the stages in the method for testing the water resistance of a timepiece according to an embodiment of the invention.

FIG. 1 depicts schematically the stages in a method for testing the water resistance of a timepiece according to an embodiment of the invention.

The first stage E1 involves measuring the rate of the timepiece when subjected to a first external pressure, advantageously atmospheric pressure. The aim of this first stage is to establish a first reference rate value.

The second stage E2 involves measuring the rate of the timepiece when subjected to a second external pressure, preferably greater than the first external pressure. For this purpose, the timepiece is disposed inside a pressurization chamber. The aim of this second stage is to establish a second rate value under pressure. It should be noted that a variant could involve subjecting the timepiece to a pressure below the first pressure in a situation under pressure. Another variant may involve the inversion of the two stages E1, E2, of which the order of realization is immaterial.

The third stage E3 involves comparing the rate under pressure with the reference rate in order to deduce therefrom the presence or otherwise of a deficiency in the water resistance in the event of a variation in excess of a predefined threshold. In fact, if the timepiece exhibits a water resistance fault, its pressurization will be transferred to its internal volume, comprising the watch movement, and will lead to a modification of its operation, which will be detected by the second measurement of the rate under pressure. Conversely, in the case of a timepiece that is normally water resistant, the variation in the external pressure surrounding the timepiece has no effect on its operation, and the two measurements of the rate obtained from stages E1 and E2 will be of equal value.

According to the embodiment of the invention, the measurements of the rate in the two first stages E1, E2 are determined by an average measurement of the rate. For this purpose, these stages measure the rate of a timepiece over a relatively long period. A minimum period of one hour advantageously permits a reliable measurement of the water resistance to be obtained that is free of the chronometric disturbances that are an intrinsic feature of the timepiece being tested.

One embodiment of the invention calculates the rate for a period t1, t2 spent at a given pressure based on the difference in time calculated from two display values for the timepiece provided by two status reports for the timepiece, in comparison with the actual elapsed time measured by a reference clock. Thus, each stage E1, E2 of measuring a rate value includes the following sub-stages:

A first sub-stage E11, E21 of the first status report PE11, PE21. The expression status report is used here to denote the acquisition of the time displayed by the timepiece, for example by means of a photograph indicating the configuration of the hands of a timepiece, in particular the angular separation between the various hands, indexed in relation to a reference clock;

A second sub-stage E12, E22 of the second status report PE12, PE22;

A third sub-stage E13, E23, performed in parallel with said two sub-stages, for measuring the exact period t1, t2 (in particular in hour(s), minute(s) and second(s)), between the two status reports, respectively PE11, P12 and PE21, P22, on the basis of a reference clock;

A fourth sub-stage E14, E24 for calculating the rate Mmi (i=1 in the first stage E1 and i=2 in the second stage E2) of the timepiece, by the following calculation:

$Mmi=(PEi2-PEi1)/ti$

For a period ti of less than or equal to 24 hours, the rate calculated in this way is converted by a rule of three in such a way as to be expressed conventionally as seconds per day (s/d). It is referred to as the "diurnal rate" in the case where ti is equal to 24 hours.

It should be noted that, during these measurement periods t1, t2, the timepiece is positioned according to a well-defined protocol. This same protocol is utilized in the two stages E1, E2. Furthermore, these two stages E1, E2 may be rapidly linked, and it may be advantageous to carry out this procedure with PE21=PE12, or a total of three status reports.

In the particular case of the second stage E2, the two status reports P21, P22 of the timepiece enabling the average rate Mm2 of the timepiece to be determined when subjected to a second external pressure are produced advantageously outside the pressurization chamber, although respectively before the introduction and after the removal of the timepiece from the pressurization chamber. This approach offers the advantage of permitting the use of a very simple pressurization chamber, since it does not require any rate measurement equipment. The measurement of the average rate advantageously permits the detection of a major leak in relation to the measurement of the instantaneous rate: even if the air escapes from the watch almost instantaneously in the course of its removal from the pressurization chamber, the fast running or the slow running of the watch recorded under pressure may be assessed at the time of the status report PE22.

In this approach, the second status report performed after the removal of the timepiece from the pressurization chamber advantageously occurs rapidly after said removal, preferably within a period of less than or equal to 30 minutes, or even less than or equal to 2 minutes.

In a manner similar to the case of a major leak, in the case of a minor leak, a sufficiently long period of being subjected to the high pressure will enable the variation in the rate to be detected in relation to the rate at atmospheric pressure. The periods t1, t2 thus lie advantageously between 2 and 8 hours.

According to the mode of implementation of the method, the status reports comprise recorded images of the configuration of the hands of a timepiece, in particular the angular separation between the various hands, in particular a first angle between a first hours hand and a second minutes hand, as well as a second angle between a third seconds hand and the first or the second hand, associated with the time indicated by a reference clock. This approach offers the advantage of permitting the implementation of an automatic measurement. As a variant, a simple recorded image may be associated with the time indicated by a reference clock, and the photographed time may then be converted by processing the image manually or digitally.

On the other hand, the second external pressure applied to a timepiece during the second measurement stage E2 advantageously lies between 2 and 5 bar. Furthermore, this pressurization is preferably slow, advantageously at an average rate of increase in the pressure comprised between 1 and 4 bar/hour, and/or over a period of at least one hour, in order to make it possible to prevent certain leaks from closing again under the effect of a rapid increase in pressure. This approach simulates immersion in a shallow depth of water, for example.

In a variant embodiment, the status reports may be implemented for only one of the two stages of measurement E1, E2, the rate being measured by any other solution in the other stage, for example by an instantaneous measurement of the rate with an integrated chronoscope over a sufficient period to enable the deduction of an average rate therefrom. This is particularly advantageous for the measurement of the first stage E1.

The method then implements the third stage of comparing the rate values measured in the two stages E1, E2, for example by taking into account the difference $\Delta=Mm2-Mm1$ between the two rate measurements, and then the comparison of the absolute value of this difference $\Delta$ with a predefined threshold. The value $\Delta$ is indirectly representative of the water resistance of the timepiece, and it may accordingly be considered as a measurement of the water resistance. The threshold is fixed at a predefined value according to the desired water resistance requirement. Advantageously, it may be fixed at a value of 10 s/d.

Figure 2:
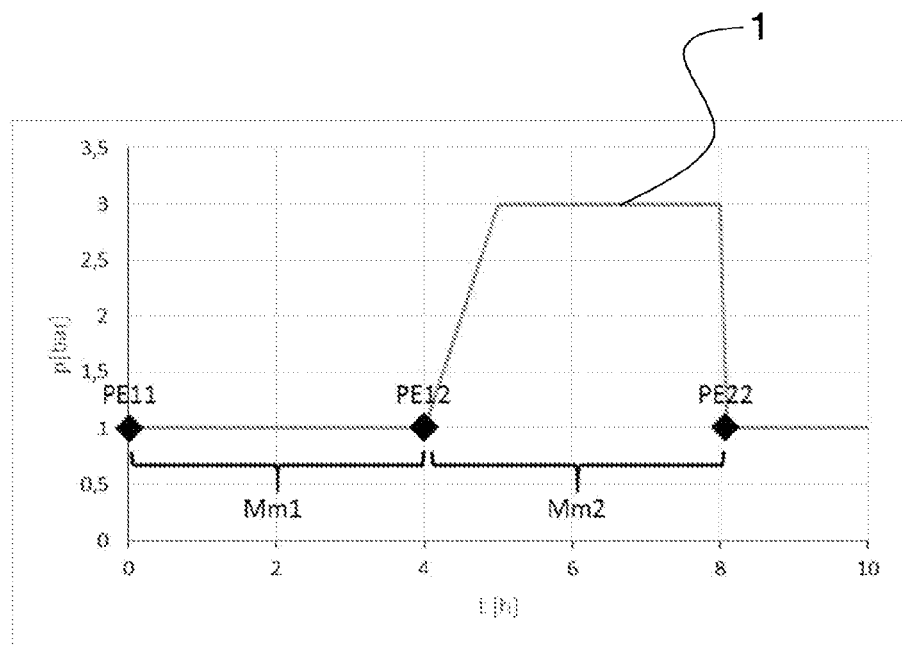
FIG. 2 depicts a basic diagram of the method according to the embodiment of the invention.

FIG. 2 thus summarizes the principle of the mode of implementation of the invention, by illustrating by means of the curve 1 the evolution of the external pressure p to which a timepiece is subjected as a function of the time. The reference rate value Mm1 is measured on the basis of two status reports PE11 and PE12 during a first period, being a period of 4 hours according to the selected illustrative embodiment, while the timepiece is positioned in an environment at a constant external pressure equal to the atmospheric pressure (1 bar). The second rate value Mm2 is measured on the basis of two status reports PE12=PE21 and PE22 during a second period, being a period of 4 hours according to the selected illustrative embodiment, while the timepiece is positioned in an environment at a higher external pressure increasing progressively from 1 to 3 bar.

According to the method of implementation described previously, a very simple pressurization chamber may be used, as mentioned previously, of which the sole function is pressurization. This approach makes it possible to propose an internal housing of large volume for the purpose of accommodating a plurality of timepieces therein, for which the method of testing the water resistance is implemented simultaneously. In this case, a status report permitting the measurement of the rate makes it possible preferably to establish a simultaneous status report for a plurality of timepieces. As a variant these status reports may be almost simultaneous, permitting successive status reports to be established at high speed, for example by automatic scanning, making it possible to obtain recorded images of the different timepieces.

The invention also relates to a method for manufacturing a timepiece, which method, towards the end of such a process, comprises the implementation of a method for testing the water resistance of the timepiece as defined previously. If the test is conclusive, the method for manufacturing is finalized, and otherwise a supplementary stage for the correction of the water resistance of the timepiece is implemented before resuming the method for testing the water resistance.

Figure 3:
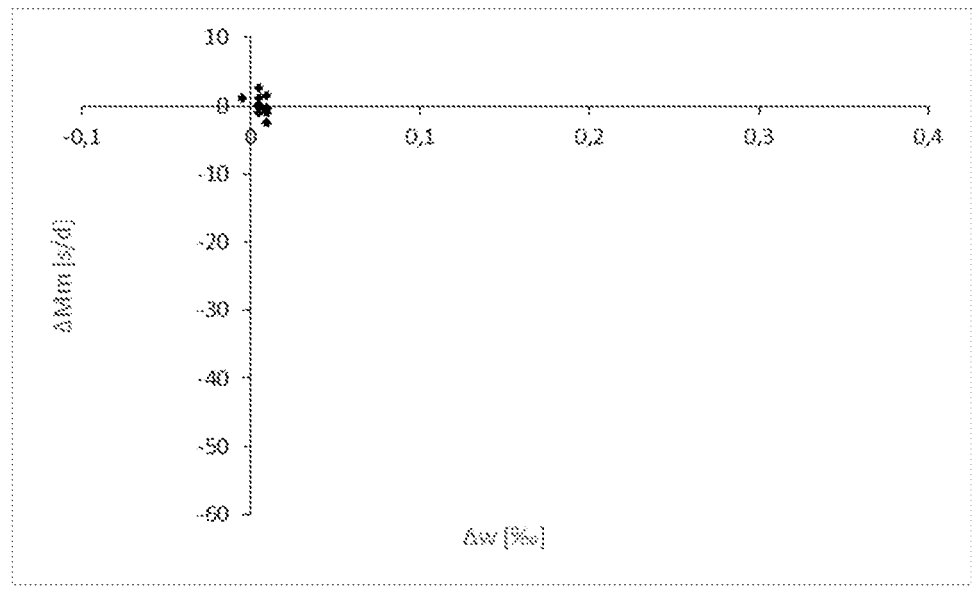
FIGS. 3 and 4 depict schematically the correlation between the water resistance and the rate of a timepiece.
Figure 4:
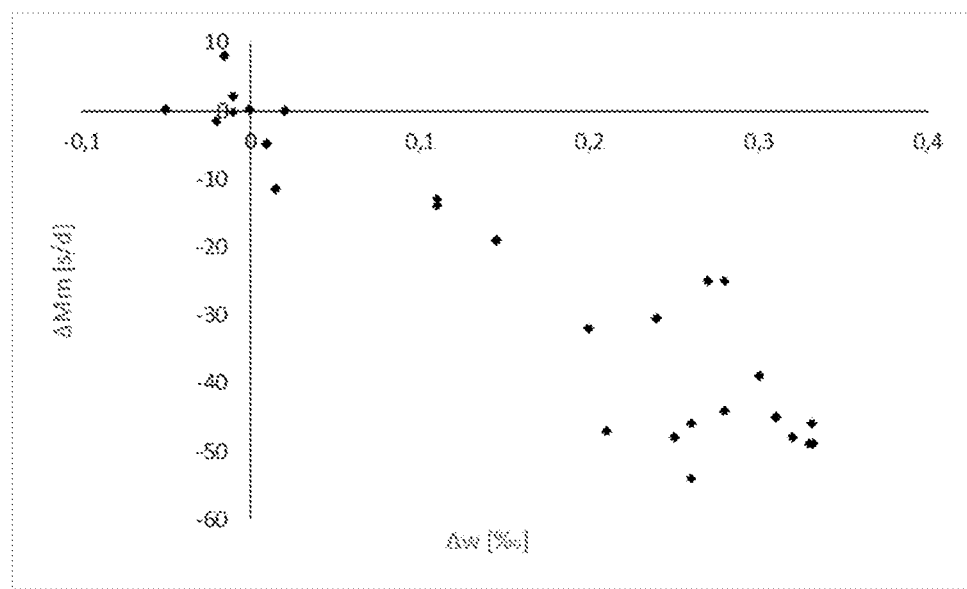

FIGS. 3 and 4 depict the variation in the rate $\Delta Mm$ of a plurality of timepieces as a function of the increase in their weight $\Delta w$ when they are positioned for 24 hours at a pressure of 5 bar. It should be noted that the increase in the weight occurs necessarily for a non-water resistant timepiece that is subjected to such conditioning, unless the leak is not very large and the air does not escape very rapidly therefrom. Conversely, a timepiece that is water resistant maintains an unchanged weight. In FIG. 3, all the timepieces are water resistant, and their weight does not increase. It will then be observed that they experience only a variation in rate induced by their intrinsic chronometric properties, or a minor variation in rate well below the predefined threshold permitting a deficiency in the water resistance to be established. The timepieces illustrated in FIG. 4, on the other hand, comprise numerous water resistance deficiencies at varying degrees: the existence of a correlation between the variation in rate and the increase in weight will be identified, which clearly confirms the existence of a correlation between the variation in rate and the presence of a deficiency in the water resistance.

The invention also relates to a system for testing the water resistance, which permits the implementation of the previously described method for testing the water resistance, preferably in a totally automated, or even almost automated manner. For this purpose, the system according to the mode of implementation comprises the following elements:

A pressurization chamber, comprising a housing intended to receive one or a plurality of timepieces;

A device for measuring the rate of a timepiece comprising, for example, a device for recording images, for example photographically, in order to implement the aforementioned status reports. Said device preferably comprises a mechanism for status reports for the timepiece, including an optical apparatus for recording images;

A reference clock, coupled to or at least correlated to the device for recording images;

A calculator, connected to the device for recording images and to the reference clock by means of a communication device, in order to receive the data for the status reports and the associated times recorded on the reference clock, and to perform the calculations of the rate values, as well as the comparisons in order to arrive at a water resistance diagnosis therefrom;

An electronic memory associated with the calculator in order to memorize the data for the status reports and for the clock and the results of the method for testing the water resistance.

The system may also comprise a transfer device permitting each timepiece to be transported automatically towards a housing at atmospheric pressure, towards the pressurization chamber, and/or towards the status report devices.

The invention also relates to a series of timepieces obtained by the previously described manufacturing method, as well as to a timepiece such as that obtained by such a manufacturing method.

The invention has been implemented on a timepiece, which may be a watch, such as a wristwatch. It may, of course, also be implemented on any element, including an intermediate element, such as a watch case containing a watch movement.

The invention claimed is:

1. A method for testing water resistance of at least one timepiece, wherein the method comprises:
   measuring a first rate of the timepiece subjected to a first external pressure, so as to obtain a first reference rate value;
   measuring a second rate of the timepiece subjected to a second external pressure inside a pressurization chamber, so as to obtain a second rate value under pressure;
   at least one of the two operations of measuring the rate of the timepiece includes measuring a time-related difference between two display values for the timepiece provided by two status reports for the timepiece, compared with a time between said two status reports measured by a reference clock; and
   comparing the rate value under pressure and the reference rate value so as to deduce therefrom presence of or otherwise deficiency in water resistance of the timepiece in an event of a variation between the rate value under pressure and the reference rate value exceeding a predefined threshold.

2. The method for testing water resistance as claimed in claim 1, wherein the first external pressure is atmospheric pressure.

3. The method for testing the water resistance as claimed in claim 1, wherein the status reports comprise recorded images associated with a time indicated by the reference clock.

4. The method for testing the water resistance as claimed in claim 1, wherein the time between the two status reports for the timepiece is greater than or equal to one hour.

5. The method for testing the water resistance as claimed in claim 1, wherein the measuring of the rate of the timepiece subjected to a second external pressure includes pressurizing the timepiece inside the pressurization chamber at a maximum value of the second external pressure in a range of from 2 to 5 bar.

6. The method for testing the water resistance as claimed in claim 1, wherein the measuring of the second rate of the timepiece subjected to a second external pressure includes slowly pressurizing the timepiece inside the pressurization chamber at an average rate of increase in the pressure in a range of from 1 to 4 bar/hour.

7. The method for testing the water resistance as claimed in claim 1, wherein the method comprises testing water resistance of a plurality of timepieces simultaneously, the timepieces being housed simultaneously inside the pressurization chamber.

8. The method for testing the water resistance as claimed in claim 1, wherein the status reports for the timepiece enabling an average rate of the timepiece subjected to the second external pressure to be determined are produced outside the pressurization chamber, before introduction and after removal of the timepiece from the pressurization chamber.

9. The method for testing water resistance as claimed in claim 8, wherein the status reports comprise recorded images associated with a time indicated by the reference clock.

10. The method for testing water resistance as claimed in claim 4, wherein the time between the two status reports for the timepiece is in a range of from 2 to 8 hours.

11. The method for testing the water resistance as claimed in claim 8, wherein the status reports produced after the removal of the timepiece from the pressurization chamber are completed within a period of less than or equal to 30 minutes.

12. The method for testing water resistance as claimed in claim 11, wherein the status reports comprise recorded images associated with a time indicated by the reference clock.

13. A method for manufacturing a timepiece, wherein the method comprises the method for testing the water resistance as claimed in claim 1.

14. A system for testing the water resistance of a timepiece for implementing the method for testing the water resistance as claimed in claim 1, wherein the system comprises a device for measuring the rate of a timepiece and a pressurization chamber defining a mounting for accommodating at least one timepiece.

15. The system for testing water resistance of a timepiece as claimed in claim 14, wherein the device for measuring the rate of a timepiece comprises a mechanism for producing the status reports for the timepiece including an optical image recording apparatus coupled to the reference clock.

16. The system for testing water resistance of a timepiece as claimed in claim 14, wherein the device for measuring the rate of a timepiece is disposed entirely outside the pressurization chamber.

17. The system for testing water resistance of a timepiece as claimed in claim 16, wherein a housing inside the pressurization chamber comprises a space adapted for simultaneous housing of a plurality of timepieces.

18. The system for testing water resistance of a timepiece as claimed in claim 16, wherein the device for measuring the rate of a timepiece comprises a mechanism for producing the status reports for the timepiece including an optical image recording apparatus coupled to the reference clock.

19. The system for testing water resistance of a timepiece as claimed in claim 14, wherein a housing inside the pressurization chamber comprises a space adapted for simultaneous housing of a plurality of timepieces.

20. The system for testing water resistance of a timepiece as claimed in claim 19, wherein the device for measuring the rate of a timepiece comprises a mechanism for producing the status reports for the timepiece including an optical image recording apparatus coupled to the reference clock.

* * * * *